Sept. 23, 1969   J. R. PRIEBE   3,469,030
OPTICAL SCANNER UTILIZING A SPHERICAL MIRROR
Filed Nov. 19, 1965   2 Sheets-Sheet 1
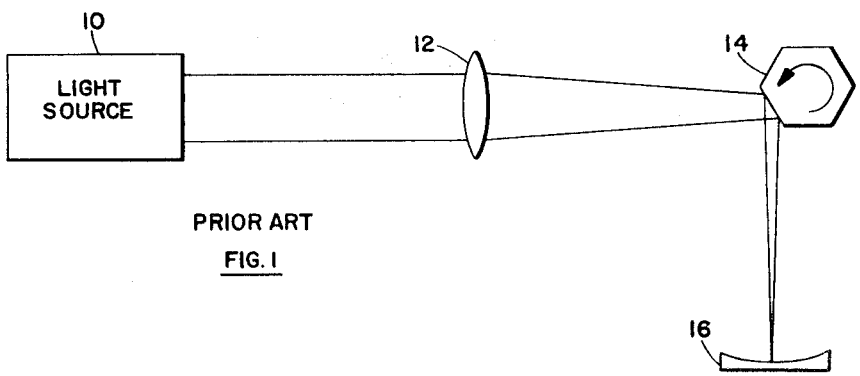
PRIOR ART
FIG. 1
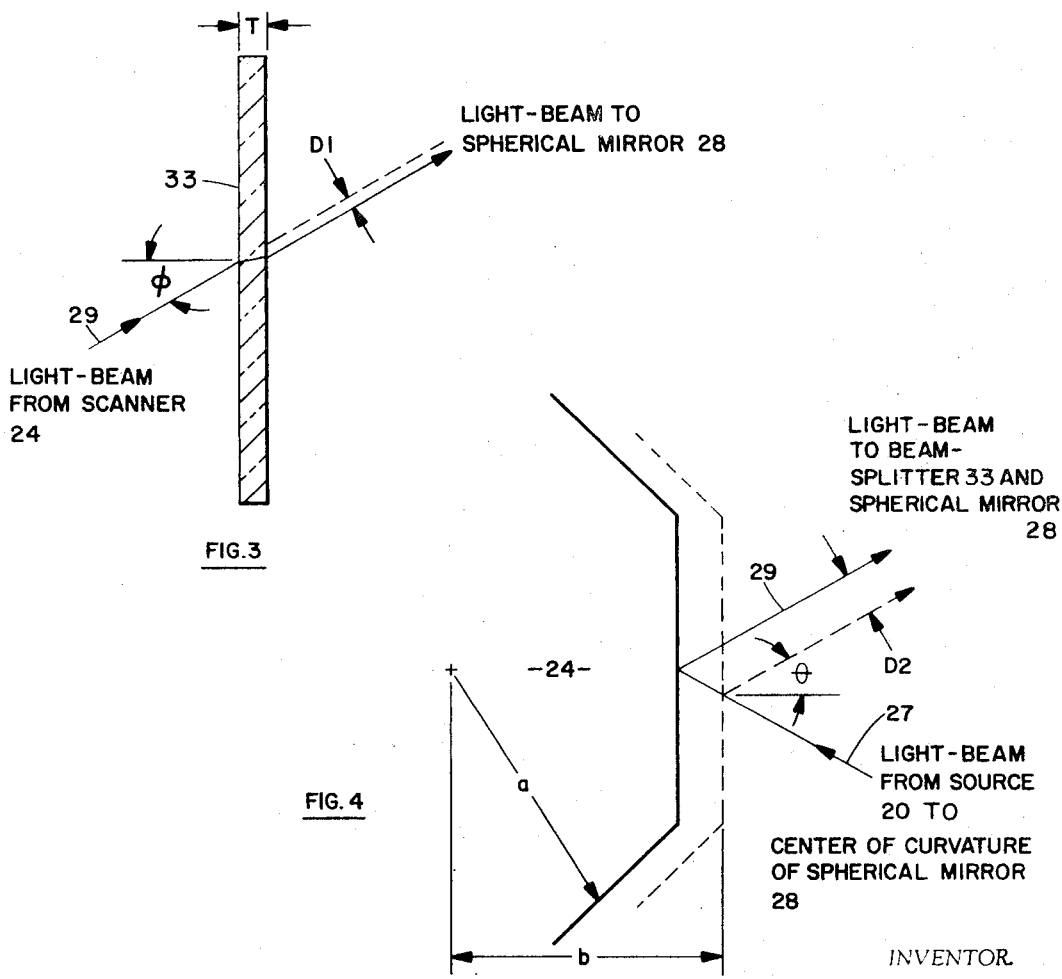
FIG. 3
FIG. 4
INVENTOR
JOHN R. PRIEBE
BY Sidney Magnes
AGENT

United States Patent Office 3,469,030
Patented Sept. 23, 1969

3,469,030
OPTICAL SCANNER UTILIZING A SPHERICAL MIRROR
John R. Priebe, Torrance, Calif., assignor to North American Rockwell Corporation, a corporation of Delaware
Filed Nov. 19, 1965, Ser. No. 508,685
Int. Cl. H04n 3/02
U.S. Cl. 178—7.6               5 Claims

---

ABSTRACT OF THE DISCLOSURE

This invention relates to an optical scanner; and more particularly to an arrangement that will move (scan) an extremely small spot of light across a given target, without introducing distortion or de-focussing of the spot of light. By using a combination of collimated light and a curved mirror, the scanning lightspot is always in focus, and of a constant size. For convenience, a beam-splitter is used to position the utilization apparatus off-axis; and the scanning-mirror is displaced longitudinally in order to compensate for the optical displacement inherently caused by the beam-splitter.

---

BACKGROUND

Figure 2:
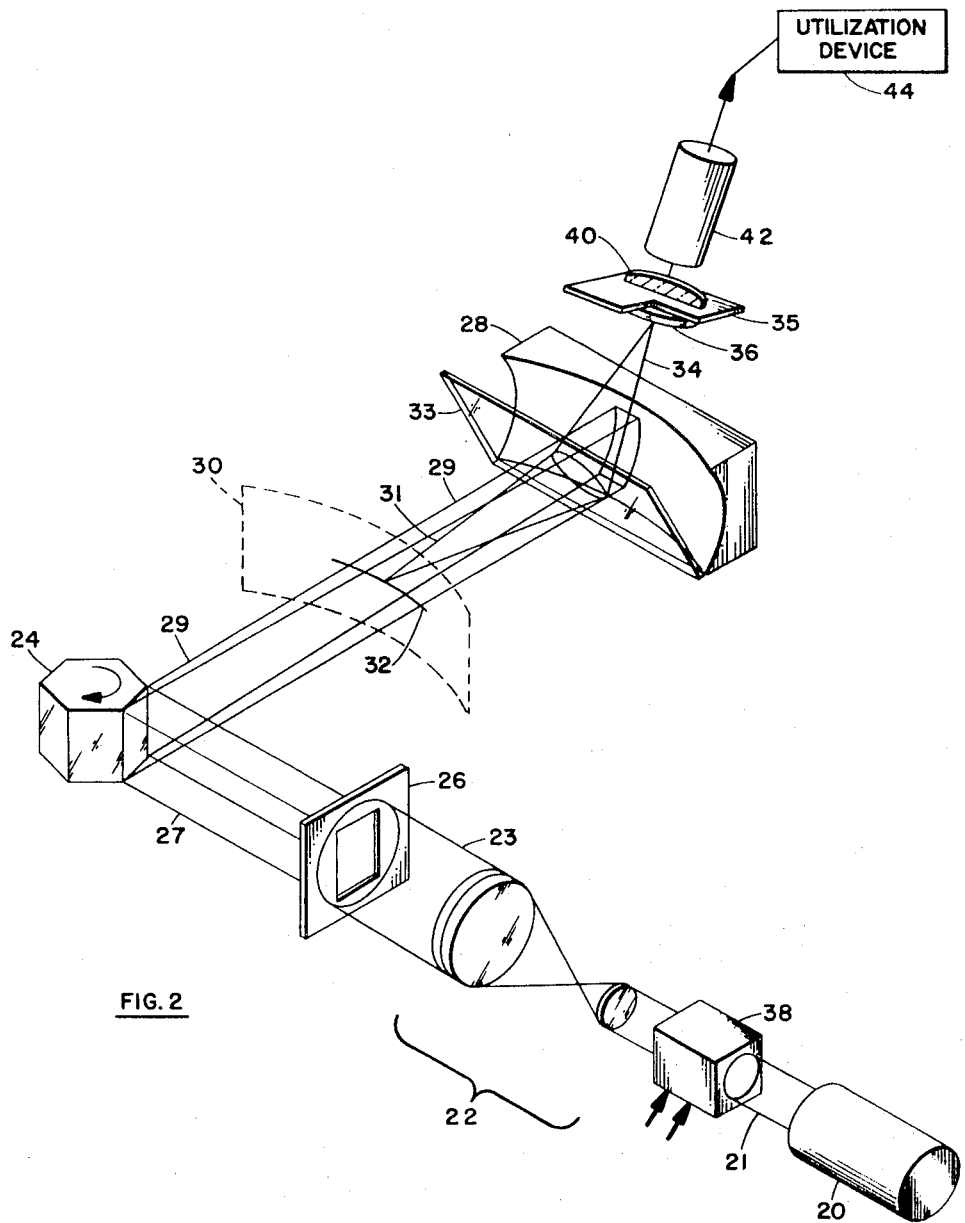

It is well known that photographic film is used to store information, this storage frequently being in the form of a moving-picture film or a slide. When recording or reproducing this type of stored information, light simultaneously impinges upon, or shines through, all parts of the film; and thus all parts of the picture are recorded or viewed simultaneously.

It is also known that another type of information—exemplified by television signals and computer signals—may take the form of a series of electrical signals that comprise variations in magnitude, timing, etc.; and that these electrical signals can be converted to "light-signals" that take the form of dots and dashes, pulses, etc. Moreover, these light-signals may be recorded on a photographic film in the form of areas having different opacities and transparencies.

When this serial type of data is recorded on a film, it generally takes the form of writing on a sheet of paper; that is, there are a plurality of lines, each comprising light and dark areas. The recording process is achieved by deflecting a beam of light, and thus causing a spot of light to move across a raw unexposed film, the intensity of the light-spot being "modulated" by the electrical signals to produce areas of opacity and transparency on the film. In order to record a great deal of information in a small space, the opaque and transparent areas are made extremely small, and the lines are spaced very close together; and this requires a spot of light that is extremely small, and remains small during the scanning process.

In reading-out the stored information, it is again necessary to deflect a beam of light so that an extremely small spot of light scans each recorded line; the light that is transmitted through by the film varying in intensity in accordance with the opaque and transparent areas on the film. Thus, it is essential that the writing and reading light-spot be, and remain, extremely small—regardless of the angle through which the beam of light is deflected. In the past, there have been a number of devices that produce scanning spots of light; but unfortunately the spots have generally become blurred, de-focussed, distorted, and/or enlarged as they are scanned across the film.

OBJECTS AND DRAWINGS

It is therefore an object of this invention to provide an improved optical scanner.

It is another object of this invention to provide an improved optical scanner wherein a minute spot of light is scanned across a target without being distorted or de-focussed as a result of scanning.

The obtainment of these objects and others will be realized from the teachings of the following specification, taken in conjunction with the drawings of which:

FIGURE 1 illustrates a prior-art arrangement;
FIGURE 2 illustrates an embodiment of the invention;
FIGURE 3 illustrates the passage of a beam of light through a beam-splitter; and
FIGURE 4 illustrates the reflection of a beam of light by a rotating multi-faceted mirror.

SYNOPSIS

Broadly speaking, the present inventive concept contemplates an optical scanning arrangement wherein the scanning light-beam is collimated, and is directed to a concave spherical mirror. This mirror focusses the light in an on-axis manner, so that a properly-focussed, minute spot of light scans across a target.

INTRODUCTION

Most prior-art scanning systems use the arrangement of FIGURE 1, wherein light from a source 10 traverses an optical system 12, which forms a convergent beam of light that impinges on a rotating multi-faceted mirror (scanner) 14 that reflects the light to focus on a target 16. As scanner 14 rotates, the active facet changes its angle relative to the impinging light; and therefore the angle of the reflected beam changes in a corresponding manner. Thus, the reflected light-beam, in the form of a focussed light-spot is scanned across target 16, which is moved after each scansion, so that a new line is scanned by each facet of scanner 14.

It should be noted that the beam of light reflected at scanner 14 is convergent; and that the reflection does not take place at the center of rotation of the reflecting surface. This displacement of the reflecting surface from the rotating scanner's center of rotation causes a variation in the length of the optical path; and, as a result, the spot of light is not always in focus at target 16. Moreover, as the light-spot is deflected to a side (off the optical axis) it tends to become degraded; i.e., de-focussed, blurred, distorted, and/or enlarged. In addition, this degradation characteristic becomes more severe as the light-spot becomes smaller, since the smaller light-spot requires that the optical system have a shorter focal length. Therefore, these prior-art systems had to compromise between a small spot and a compact arrangement. Thus, despite all efforts, prior-art off-axis systems have not proven entirely satisfactory for scanning a minute, five-micron-diameter light-spot across a target for writing or reading serial-type information.

DESCRIPTION OF INVENTION

The operation of one embodiment of the invention will be understood from FIGURE 2. Here, a light-beam 21 from a source 20—such as a laser—is passed through an optical system 22 that causes a collimated light-beam 27 to impinge upon a scanner 24. Scanner 24 is rotated by means such as a motor (not shown), and causes light-beam 29 to be scanned through a given angle. FIGURE 2 shows scanner 24 as a rotating polygon having a plurality of mirrored surfaces, as this type of scanner produces a large number of high-speed scansions; but alternatively, the scanner may be any other suitable device—such as the well-known mirrored piezoelectric crystals; materials, such as KTN, that change their index of refraction when exposed to a voltage; materials, such as glass, that change their index of refraction when squeezed, etc.

Since a laser light-source produces a small-diameter light-beam 21, optical system 22 operates upon the light from source 20, and produces an enlarged, collimated light-beam 23 of suitable diameter to utilize the facets of scanner 24. A rectangular-apertured stop 26 may be positioned in the collimated light-beam 23 in order to produce a rectangular light-beam 27 that is restricted to the size of a facet of scanner 24, and thus minimizes the presence of stray undesired scanning light-beams from other facets.

In accordance with the present inventive concept, scanner 24 is positioned in such a manner that its reflective surfaces are at the center of curvature of a concave spherical mirror 28. Thus, a collimated rectangular-cross-sectioned scanning light-beam 29 from scanner 24 impinges perpendicularly onto the reflective surface of spherical mirror 28. It is known that a spherical mirror has a curved focal plane positioned half-way between the spherical mirror and its center of curvature; and this curved focal plane is indicated in FIGURE 2 by the phantom curved-plane 30. As a result, the rectangular collimated light-beam 29 impinging upon spherical mirror 28 is reflected as a convergent conical light-beam 31 that is focussed to a point at curved focal plane 30.

As scanner 24 rotates, it deflects the collimated light-beam 29 across mirror 28; this beam of light always impinging perpendicularly on the spherical mirror 28 regardless of the angular deflection the light-beam experiences at scanner 24. Since the perpendicularly-impinging collimated light-beam 29 is reflected from mirror 28 perpendicularly to the reflective surface of mirror 28, and is always focussed at focal plane 30, the scanning action produces a bright line 32 across focal plane 30. Thus, light-beam 31 always impinges upon focal plane 30 in the form of an extremely small sharply-focussed undistorted spot of light. Moreover, regardless of the angular position of scanner 24, light-beams 29 and 31 are always on the optical axis.

Mirror 28 is preferably spherical rather than cylindrical, so that the portions of the light-beam above and below its center are also focussed at focal-plane 30, thus producing a focussed spot of light rather than a focussed line of light.

For convenience of structure, a beam-splitter 33, which may be a semi-transparent mirror, is positioned in front of mirror 28. Beam-splitter 33 reflects the reflected convergent light-beam 31 as a convergent light-beam 34 to an arrangement that comprises a target 35 and a suitable holder therefor. Target 35 is effectively at the focal plane. Thus, the light is focussed on—and scans across—target 35 rather than focal plane 30.

If the target is rigid, such as photo-sensitive or photo-sensitized glass, a field-flattening lens 36 compensates for the difference between the flat target and curved focal plane; whereas if the target is flexible, such as a reel of film, it may be curved to match the curved focal plane. Suitable well-known means, such as a vacuum platten and a sprocket, may be used for curving and advancing a flexible target.

It is known that a spherical reflector introduces characteristics known as "spherical aberrations"; and optical system 22 therefore includes a corrector-lens for compensating for the spherical aberrations. Spherical aberrations, their causes and correction, and field-flattening lenses of the Schmidt and Maksutov types, are discussed in many optical publications, such as "Fundamentals of Optics"— Jenkins and White, "Light"—R. W. Ditchburn, "Technique of Optical Instrument-Design"—R. J. Bracey, and "Military-Standardization Optical Design, MIL–HDBK .141."

For recording information, the light-beam 21 from laser 20 is modulated by electrical signals applied to any well-known light-modulator 38; whereas for readout, the light that traverses target 35 is collected by a collector lens 40 that directs the light-beam 41 to a photo-multiplier tube 42 that produces an electrical signal that is applied to a utilization device 44.

FIGURE 2 shows light-source 20 as being to one side of mirror 28; but alternatively it may be positioned below or above the mirror 28.

It is known that a semi-transparent mirror has an inherent displacement characteristic that may be disadvantageous, and this will be understood from the following discussion. Referring to FIGURE 3, which is a top cross-sectional view of beam-splitter 33 and one of its associated light-beam paths, it will be seen that as the light-beam 29 from scanner 24 is deflected to the left, and traverses beam-splitter 33 on its way to spherical mirror 28, the light-beam is displaced slightly rightwardly in a horizontal direction, the displacement being indicated by reference character D1. It can be shown that displacement D1, due to the beam-splitter, is, for all practical purposes, given by the following equation.

$$D1 = T \sin \phi \left[ 1 - \frac{\cos \phi}{\sqrt{n^2 - \sin^2 \phi}} \right] \quad (1)$$

where:

T=thickness of the beam-splitter
$\phi$=incident angle
n=refractive index of the beam-splitter It should be noted that when angle $\phi$ equals zero, i.e., the light-beam is on-center, the displacement D1 disappears; and that when the light-beam 29 is deflected to the right, the displacement is then in the opposite direction.

It was previously pointed out that when a reflective surface is reflecting a convergent light-beam, and does not rotate about a rotational axis in its reflecting surface, it changes the optical path-length. The present arrangement reflects a collimated light-beam, and thus obviates this problem; but the reflection details are shown in FIGURE 4, which is a top-view of scanner 24 and one of its associated light-beam paths—corresponding to that of FIGURE 3.

Referring to FIGURE 4, assume first that polygonal scanner 24 is positioned so that its reflective surfaces pass through the center of curvature of the spherical mirror 28, as indicated by the dotted-line position of scanner 24. Under this condition, the beam of light would be reflected as indicated by the dotted-line light-beam path. If however, scanner 24 is actually positioned as indicated by the solid-line position of the scanner, the beam of light is reflected as indicated by the solid-line light-beam path. It will be noted that there is a leftward displacement D2, and that displacement D2 of FIGURE 4 is in the opposite direction compared to displacement D1 of FIGURE 3.

It can be shown that displacement D2 due to scanner-positioning is, to all practical purposes, given by the following equation.

$$D2 = 2 \sin [(\theta/2)[a-b] \cos (\theta/2)]$$

where:
a=normal radius to polygon surface
b=separation of center of polygon from center of curvature of primary mirror
$\theta$=angle of reflection from scanner It should be noted that—as in the case of the displacement due to the beam-splitter—when angle $\theta$ equals zero; that is, the light-beam is on-center, the displacement D2 disappears; and that when the light-beam is deflected to the right, the displacement is in the opposite direction.

The displacements D1 and D2 may be made to compensate for each other, as indicated by the following equation.

Total displacement=$D1+D2=$ $$T \sin \phi \left[ 1 - \frac{\cos \phi}{\sqrt{n^2 - \sin^2 \phi}} \right] + 2 \sin (\theta/2)[a - b \cos (\theta/2)]$$

(3)

Working with Equation 3, the various factors T, n, a, b may be selected to minimize the total displacement, at which time displacement D1 will be substantially compensated by displacement D2.

Several things should be noted about the disclosed arrangement. Firstly, the scanning light-beam is collimated, and not convergent as in prior-art arrangements. Secondly, the optical path-length between the focussing mirror and the target is constant, in contradistinction to prior-art arrangements. Thirdly, the spherical mirror may have a short focal length, which permits the simultaneous achievement of a minute light-spot and a compart mechanism. Fouthly, the scanning-spot is always on-axis, thus minimizing degradation. And finally, the scanner may be position to compensate for an inherent disadvantage of the beam-splitter, so that the overall operation is optimized.

Thus, the disclosed inventive concept produces an on-axis optical scanning arrangement wherein a focussed minute spot of light may be scanned across a target for recording data or reading-out stored data.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. An optical scanner comprising:
   a spherically-curved primary mirror having given radii of a curvature and a given focal plane;
   a light source;
   means for causing the light from said light source to be collimated; and
   scanning means, positioned substantially at the center of curvature of said primary mirror, for directing said collimated light from said source to said spherically-curved mirror substantially along successively different ones of said radii of curvature, said spherically-curved mirror converting said collimated light to a focussed lightbeam that is focussed to a small light-spot at said focal plane regardless of optical path-length differences introduced by said scanning means.

2. An optical scanner comprising:
   a spherically-curved primary mirror having given radii of curvature and a given focal plane;
   a light source;
   means for causing the light from said light source to be collimated;
   scanning means, positioned substantially at the center of curvature of said primary mirror, for directing said collimated light from said source to said spherically-curved mirror substantially along successively different ones of said radii of curvature, said spherically-curved mirror converting said collimated light to a focussed lightbeam that is focussed to a small light-spot at said focal plane regardless of optical path-length differences introduced by said scanning means; and
   beam-splitter means, interposed between said scanner and said spherically-curved primary mirror, for transmitting light to the primary mirror and for reflecting light from the primary mirror to a target, said beam-splitter inherently displacing light from the radius of the primary mirror, said scanner mirror being positioned to effect displacement of the light reflected therefrom in a sense to compensate for the displacement caused by the beam-splitter.

3. An optical scanner comprising:
   a concave spherical mirror having a curved focal plane and a given center of curvature, said mirror accepting a collimated light-beam and forming a convergent light-beam that is focussed at said focal plane;
   rotatable multi-faceted scanner means, having a plurality of rectangular reflective facets, and being de-positioned by a selected amount from a position at which the acting facet is substantially at said center of curvature of said spherical mirror, for deflecting said collimated light-beam across said spherical mirror;
   a light source;
   an optical system positioned between said light-source and said scanner, said optical system having means for causing the light from said light-source to form a collimated beam of light of a diameter large enough to be utilized by said scanner, said optical system also having lens means for compensating for the spherical aberrations of said spherical mirror;
   a rectangular-apertured stop positioned between said optical system and said scanner, said rectangular aperture being sized to restrict said collimated light-beam from said optical system to the size of a single facet of said scanner; and
   semi-transparent beam-splitter means, positioned between said spherical mirror and said focal plane, for directing the convergent beam of light from said spherical mirror to a target, said semi-transparent device having an inherent beam displacement, the inherent beam displacement of said semi-transparent device being compensated by the de-positioning of said scanning means.

4. The combination of claim 3 including light-modulating means, positioned between said light-source and said target, for intensity-modulating said light beam in accordance with incoming electrical signals.

5. An optical scanner comprising:
   a concave spherical mirror having a curved focal plane and a given center of curvature, said mirror accepting a collimated light-beam and forming a convergent light-beam that is focussed at said focal plane;
   rotatable multi-faceted scanner means, having a plurality of reflective facets, and being de-positioned by a selected amount from a position at which the acting facet is substantially at said center of curvature of said spherical mirror, for deflecting said collimated light-beam across said spherical mirror;
   a light source;
   an optical system positioned between said light-source and said scanner, said optical system having means for causing the light from said light-source to form a collimated beam of light of a diameter large enough to be utilized by said scanner; and
   semi-transparent beam-splitter means, positioned between said spherical mirror and said focal plane, for directing the convergent beam of light from said spherical mirror to a target, said semi-transparent device having an inherent beam displacement, the inherent beam displacement of said semi-transparent device being compensated by the de-positioning of said scanning means.

References Cited

UNITED STATES PATENTS

| | | | |
|---|---|---|---|
| 2,769,374 | 11/1956 | Sick | 250—236 |
| 2,961,547 | 11/1960 | Snavely | 250—235 |
| 3,273,446 | 9/1966 | Goetz | 178—7.6 |
| 3,277,772 | 10/1966 | Atwood | 178—7.6 |
| 3,360,659 | 12/1967 | Young. | |
| 2,410,550 | 11/1946 | Padva | 350—285 |
| 2,853,918 | 9/1958 | Yoler | 350—7 |
| 3,211,046 | 10/1965 | Kennedy | 350—7 |

ROBERT L. GRIFFIN, Primary Examiner

J. A. ORSINO, Jr., Assistant Examiner

U.S. Cl. X.R.

178—7.1; 250—236; 350—6, 7, 285

PO-1050
(5/69)

UNITED STATES PATENT OFFICE
CERTIFICATE OF CORRECTION

Patent No. 3,469,030      Dated Sept. 23, 1969

Inventor(s) J. R. Priebe

It is certified that error appears in the above-identified patent and that said Letters Patent are hereby corrected as shown below:

In Column 4, equation (2) should be as follows:

$$D2 = 2 \sin(\theta/2) \left[ a - b \cos(\theta/2) \right] \qquad (2)$$

SIGNED AND
SEALED
JAN 20 1970

(SEAL)
Attest:

Edward M. Fletcher, Jr.
Attesting Officer

WILLIAM E. SCHUYLER, JR.
Commissioner of Patents